(12) United States Patent
Shalem

(10) Patent No.: US 12,063,117 B2
(45) Date of Patent: Aug. 13, 2024

(54) WIRELESS DATA TRANSMISSION SYSTEM AND METHOD

(71) Applicant: ELBIT SYSTEMS C4I AND CYBER LTD., Netanya (IL)

(72) Inventor: Ofer Shalem, Netanya (IL)

(73) Assignee: ELBIT SYSTEMS C4I AND CYBER LTD., Netanya (IL)

( * ) Notice: Subject to any disclaimer, the term of this patent is extended or adjusted under 35 U.S.C. 154(b) by 0 days.

(21) Appl. No.: 18/611,788

(22) Filed: Mar. 21, 2024

(65) Prior Publication Data

US 2024/0243851 A1     Jul. 18, 2024

Related U.S. Application Data

(63) Continuation of application No. PCT/IL2022/050758, filed on Jul. 13, 2022.

(30) Foreign Application Priority Data

Sep. 29, 2021   (IL) .......................................... 286821

(51) Int. Cl.
    *H04W 72/04*        (2023.01)
    *H04L 1/1812*       (2023.01)

(52) U.S. Cl.
    CPC ................................. *H04L 1/1816* (2013.01)

(58) Field of Classification Search
    CPC ............... H04L 1/1816; H04W 28/02; H04W 28/0967; H04W 28/0268; H04W 28/24; H04W 72/566; H04W 76/14; H04W 74/08; H04W 24/10

See application file for complete search history.

(56) References Cited

U.S. PATENT DOCUMENTS

| | | |
|---|---|---|
| 6,977,888 B1 | 12/2005 | Frenger et al. |
| 2005/0122898 A1 | 6/2005 | Jang et al. |
| 2007/0064669 A1 | 3/2007 | Classon et al. |
| 2007/0106924 A1 | 5/2007 | Seidel et al. |
| 2008/0052605 A1 | 2/2008 | Luo et al. |
| 2008/0222154 A1* | 9/2008 | Harrington ........... G06F 16/184 |
| 2012/0069798 A1 | 3/2012 | Kumar |
| 2015/0117339 A1 | 4/2015 | Siomina et al. |
| 2017/0064579 A1 | 3/2017 | Park et al. |
| 2018/0332501 A1 | 11/2018 | Tseng |

(Continued)

*Primary Examiner* — Jamal Javaid
(74) *Attorney, Agent, or Firm* — S.J. Intellectual Property Ltd.

(57) ABSTRACT

A wireless data transmission system and method is disclosed. A given frame comprising a distinct message is transmitted to a designated receiver. Responsive to a failure of the designated receiver to detect the distinct message, one or more first copies of the distinct message are added to at least one first subsequent frame of one or more subsequent frames, subsequent to the given frame, designating the designated receiver. Moreover, one or more second copies of the distinct message are added to at least one second subsequent frame of the subsequent frames, wherein a first number of the first copies is different than a second number of the second copies. The first copies and the second copies are added to meet a Quality of Service (QoS) requirement for a communication link between the wireless data transmission system and the designated receiver and a delay requirement for the communication link.

20 Claims, 1 Drawing Sheet

(56) References Cited

U.S. PATENT DOCUMENTS

| | | | |
|---|---|---|---|
| 2019/0150140 A1* | 5/2019 | Patel | H04L 1/08 370/336 |
| 2019/0254047 A1 | 8/2019 | Ahmed et al. | |
| 2021/0297901 A1 | 9/2021 | Tang | |

* cited by examiner

WIRELESS DATA TRANSMISSION SYSTEM AND METHOD

TECHNICAL FIELD

The invention relates to a wireless data transmission system and method.

BACKGROUND

In a wireless communications system, a transmitter of a source device can be configured to transmit one or more frames of data to a designated receiver of a destination device, each frame of the frames including one or more messages. The designated receiver may not detect at least some of the messages in a given frame of the frames due to poor communication conditions over the communication link between the source device and the destination device or artificial interferences that interfere with the communication link.

In the event that a transmitted message is not detected by the designated receiver, the message can be retransmitted during one or more subsequent frames, subsequent to the given frame, until a detection thereof, using an Automatic Repeat Request (ARQ) mechanism or a Hybrid ARQ (HARQ) mechanism. However, the maximum number of subsequent frames in which the message can be retransmitted is limited by a delay requirement of the communication link. In the event that the designated receiver does not detect the message after the retransmission of the message over the maximum number of subsequent frames, the message is neglected. That is, due to the delay requirement of the communication link, the Quality-of-Service (QoS) of the communication link is limited.

There is thus a need in the art for a new wireless data transmission system and method for enabling an increased QoS of a communication link in a limited delay wireless communication system.

References considered to be relevant as background to the presently disclosed subject matter are listed below. Acknowledgement of the references herein is not to be inferred as meaning that these are in any way relevant to the patentability of the presently disclosed subject matter.

U.S. Patent Application Publication No. 2017/0064579, published on Mar. 2, 2017, discloses an example method that may include receiving, by a computing device, control plane signaling associated with a first service to be performed by a first communication device, wherein the computing device is within a radio access network (RAN) and is in limited communication with a core network via a backhaul connection that is constrained due to a backhaul bottleneck condition. The example method may include conditionally permitting, by the computing device, a first feature of the first service based at least in part on the backhaul bottleneck condition. Another example method may include receiving, by a computing device, control plane signaling associated with a service to be performed by a first communication device, wherein the computing device is within a RAN and is in limited communication with a core network via a backhaul connection that is constrained due to a backhaul bottleneck condition.

U.S. Patent Application Publication No. 2019/0254047, published on Aug. 15, 2019, discloses a system, method, and interfaces for Radio Access Networks and Cloud Radio Access Networks.

Emerson Cabrera, "Adaptive HARQ (A-HARQ) for Ultra-Reliable Communication in 5G", Master's Thesis, Macquarie University, Oct. 9, 2015, addresses the need for motivating applications, such as mission critical industrial control and medical applications, to operate under Ultra-Reliable Communication (URC) mode in future 5th Generation (5G) cellular wireless networks, while also under strict Quality of Service (QoS) constraints such as ultralow latency. An Adaptive HARQ (A-HARQ) scheme is proposed, where retransmission (RTX) of erroneous packets during poor channel conditions is implemented on better-quality sub-bands, with resources dynamically allocated based on Channel Quality Indicator (CQI) reports. A-HARQ also increases the number of RTX within a 4 ms time period, by utilizing Transmission Time Interval (TTI) bundling to decrease the delay incurred from many RTX. Performance analysis is conducted, by comparing A-HARQ and the legacy HARQ in terms of delay, where A-HARQ was shown to have about 35% lower delay than the legacy HARQ, with a slight decrease in throughput.

U.S. Patent Application Publication No. 2005/0122898, published on Jun. 9, 2005, discloses an HARQ method for guaranteeing a QoS in a wireless communication system. In a transmitting apparatus using a HARQ for transmitting packet data in a wireless communication system, a retransmission controller determines the size of redundancy information for correcting transmission errors in packet data, and a transmitter transmits the redundancy information of the determined size upon request for a retransmission of the packet data. Transmission of redundancy information of a variable size at each retransmission satisfies the QoS required for each user, maximizes a data throughput, and allows for the efficient reception of an ACK or a NACK for the redundancy information.

U.S. Patent Application Publication No. 2018/0332501, published on Nov. 15, 2018, discloses a method for packet data convergence protocol (PDCP) protocol data unit (PDU) duplication and transport block (TB) repetition. The method includes providing a radio access network (RAN) configuration having at least one of a PDCP PDU duplication configuration or a TB repetition configuration, performing at least one of PDCP PDU duplication or TB repetition based on one or more triggering events in the RAN configuration, where the PDCP PDU duplication includes providing at least one duplicated PDCP PDU to a radio link control (RLC) bearer.

U.S. Patent Application Publication No. 2007/0106924, published on May 10, 2007, relates to a method for scheduling data retransmissions, a method for use in a data retransmission scheme and a method for updating a soft buffer of a base station in a mobile communication system during a soft-handover. The publication relates to a base station executing the controlling and updating method, a communication terminal for executing the scheduling method and to a mobile communication system comprising at least one the base station and communication terminal. To prevent erroneous combining of data packets in a packet retransmission scheme at the receiver, the publication provides a method that may flush the soft buffer region associated to a received data packet upon its correct reception. Further, a method is provided that monitors the time elapsed since the last storing of a data packet in a buffer region of a base station to be able to trigger the flush of the buffer region upon expiry of a threshold time period.

U.S. Patent Application Publication No. 2008/0052605, published on Feb. 28, 2008, discloses a method for recovering a lost data unit, the method including: partitioning data to be transmitted into one or more data units, sorting the data units according to importance levels of the data units, and determining a check rule for the one or more data units; performing, by a transmitting end, a calculation on the sorted data units according to a predetermined algorithm depending on the check rule, to generate one or more corresponding check units; transmitting, by the transmitting end, the one or more data units to a receiving end in a sorted order, and transmitting the corresponding check units to the receiving end; recovering, by the receiving end, a lost data unit according to the received data units and check units as well as the check rule.

U.S. Patent Application Publication No. 2007/0064669, published on Mar. 22, 2007, discloses dividing radio frames into a plurality of subframes during operation. Data is transmitted over the radio frames within a plurality of subframes, and having a frame duration selected from two or more possible frame durations.

U.S. Pat. No. 6,977,888, published on Dec. 20, 2005, discloses using a hybrid ARQ scheme with incremental data packet combining. In an example embodiment, the hybrid ARQ scheme with incremental data packet combining employs three feedback signaling commands: ACK, NACK, and LOST. Using these three feedback commands, the hybrid ARQ scheme with incremental data packet combining provides both robustness and good performance.

U.S. Patent Application Publication No. 2012/0069798, published on Mar. 22, 2012, discloses a method, apparatus, processing system, and computer program product that enable association of mis-aligned subframes from a first and second downlink with one another, such that a HARQ acknowledgment message including jointly encoded feedback for the respective subframes can be correctly interpreted by the corresponding cells. Here, an RNC may provide an RRC message to the UE to associate particular subframes with one another. Further, the RNC may provide NBAP messages to the cells transmitting the downlink signals, so that the cells can associate the HARQ acknowledgment message with the appropriate subframe. Still further, additional signaling provides for changing the set of associated subframes when needed due to a drift in the timing offset between cells.

U.S. Patent Application Publication No. 2012/0320745, published on Dec. 20, 2012, discloses a method for scheduling a Guaranteed Bit Rate (GBR) service based on Quality of Service (QoS) and an apparatus implementing the method, wherein the method comprises the steps of: determining a scheduling priority of an online user according to an average rate of a GBR service of the user in a current Transmission Time Interval (TTI); and scheduling the user in accordance with the determined priority and allocating Resource Block (RB) resources to the user. With the scheduling method of the disclosure, the RB resource can be fully utilized, and the user rate which does not reach the GBR is quickly improved to make as many users as possible to reach the GBR, so as to increase the number of satisfied users in system. For the case in which a Maximum Bit Rate (MBR) is greater than the GBR, on the basis that as many users as possible are made to reach the GBR, the rates of the users can be further improved to increase the number of users with high rates.

GENERAL DESCRIPTION

In accordance with a first aspect of the presently disclosed subject matter, there is provided a wireless data transmission system, the wireless data transmission system comprising a processing circuitry configured to: transmit a given frame comprising one or more distinct messages to a designated receiver; responsive to a failure of the designated receiver to detect one or more given distinct messages of the distinct messages, add at least two copies of at least one of the given distinct messages, to at least one subsequent frame of one or more subsequent frames, subsequent to the given frame, designating the designated receiver; and transmit the subsequent frames to the designated receiver.

In some cases, the processing circuitry is further configured to: provide (a) a Quality of Service (QoS) requirement for a communication link between the wireless data transmission system and the designated receiver, and (b) a delay requirement for the communication link; and determine: (a) based on the delay requirement, a first number of allowed retransmission frames usable for retransmitting the given distinct messages, wherein a second number of the subsequent frames is less than or equal to the first number of allowed retransmission frames; and (b) based on the QoS requirement, a third number of allocated retransmission copies of the given distinct messages, wherein a total number of actual retransmission copies of each of the given distinct messages is less than or equal to the third number of allocated retransmission copies.

In some cases, the subsequent frames are transmitted until receipt of a success notification indicative of a success of receipt of the given distinct messages, or until the second number of the subsequent frames equals the first number of allowed retransmission frames.

In some cases, the third number of allocated retransmission copies is also determined based on an average message error rate associated with the communication link.

In some cases, the processing circuitry is further configured to determine a distribution of the allocated retransmission copies of each of the given distinct messages across the allowed retransmission frames.

In some cases, for each subsequent frame of the subsequent frames, at least one copy of each of the given distinct messages that are added to the respective subsequent frame is added to a leading end of the respective subsequent frame.

In some cases, the at least one copy of each of the given distinct messages that is added to the leading end of the respective subsequent frame is added in accordance with an appearance order of the given distinct messages in the given frame.

In some cases, the processing circuitry is further configured to employ frequency hopping during a transmission of the subsequent frames.

In some cases, upon one or more of the subsequent frames having free space, being free space frames, the processing circuitry is further configured to add free space copies of one or more of the given distinct messages to the free space in the free space frames.

In some cases, the copies of the given distinct messages that are added to the subsequent frames are independently decodable.

In accordance with a second aspect of the presently disclosed subject matter, there is provided a wireless data transmission method, comprising: transmitting a given frame comprising one or more distinct messages to a designated receiver; responsive to a failure of the designated receiver to detect one or more given distinct messages of the distinct messages, adding at least two copies of at least one of the given distinct messages, to at least one subsequent frame of one or more subsequent frames, subsequent to the given frame, designating the designated receiver; and transmitting the subsequent frames to the designated receiver.

In some cases, the wireless data transmission method further comprises: providing (a) a Quality of Service (QoS)

requirement for a communication link between the wireless data transmission system and the designated receiver, and (b) a delay requirement for the communication link; and determining: (a) based on the delay requirement, a first number of allowed retransmission frames usable for retransmitting the given distinct messages, wherein a second number of the subsequent frames is less than or equal to the first number of allowed retransmission frames; and (b) based on the QoS requirement, a third number of allocated retransmission copies of the given distinct messages, wherein a total number of actual retransmission copies of each of the given distinct messages is less than or equal to the third number of allocated retransmission copies.

In some cases, the subsequent frames are transmitted until receipt of a success notification indicative of a success of receipt of the given distinct messages, or until the second number of the subsequent frames equals the first number of allowed retransmission frames.

In some cases, the third number of allocated retransmission copies is also determined based on an average message error rate associated with the communication link.

In some cases, the wireless data transmission method further comprises: determining a distribution of the allocated retransmission copies of each of the given distinct messages across the allowed retransmission frames.

In some cases, for each subsequent frame of the subsequent frames, at least one copy of each of the given distinct messages that are added to the respective subsequent frame is added to a leading end of the respective subsequent frame.

In some cases, the at least one copy of each of the given distinct messages that is added to the leading end of the respective subsequent frame is added in accordance with an appearance order of the given distinct messages in the given frame.

In some cases, the wireless data transmission method further comprises: employing frequency hopping during a transmission of the subsequent frames.

In some cases, upon one or more of the subsequent frames having free space, being free space frames, the wireless data transmission method further comprises: adding free space copies of one or more of the given distinct messages to the free space in the free space frames.

In some cases, the copies of the given distinct messages that are added to the subsequent frames are independently decodable.

In accordance with a third aspect of the presently disclosed subject matter, there is provided a non-transitory computer readable storage medium having computer readable program code embodied therewith, the computer readable program code, executable by at least one processor of a computer to perform a wireless data transmission method comprising: transmitting a given frame comprising one or more distinct messages to a designated receiver; responsive to a failure of the designated receiver to detect one or more given distinct messages of the distinct messages, adding at least two copies of at least one of the given distinct messages, to at least one subsequent frame of one or more subsequent frames, subsequent to the given frame, designating the designated receiver; and transmitting the subsequent frames to the designated receiver.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which.

DETAILED DESCRIPTION

Figure 1:
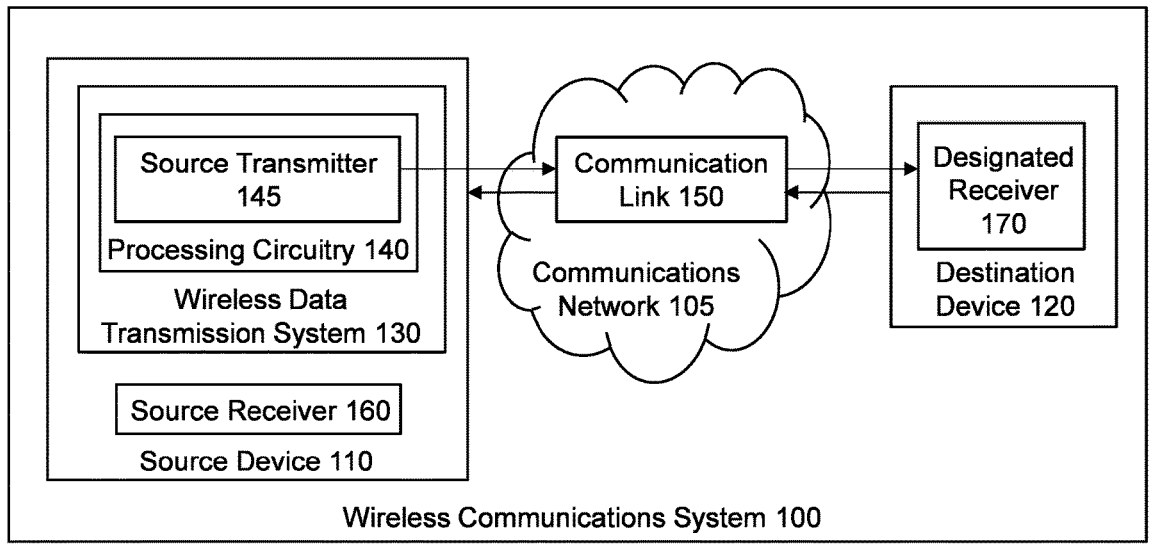
FIG. 1 is a block diagram schematically illustrating an example of a wireless communications system, in accordance with the presently disclosed subject matter.

In the following detailed description, numerous specific details are set forth in order to provide a thorough understanding of the presently disclosed subject matter. However, it will be understood by those skilled in the art that the presently disclosed subject matter may be practiced without these specific details. In other instances, well-known methods, procedures, and components have not been described in detail so as not to obscure the presently disclosed subject matter.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "transmitting", "adding", "retransmitting", "determining", "providing", "allocating" or the like, include actions and/or processes, including, inter alia, actions and/or processes of a computer, that manipulate and/or transform data into other data, said data represented as physical quantities, e.g. such as electronic quantities, and/or said data representing the physical objects. The terms "computer", "processor", "processing circuitry" and "controller" should be expansively construed to cover any kind of electronic device with data processing capabilities, including, by way of non-limiting example, a personal desktop/laptop computer, a server, a computing system, a communication device, a smartphone, a tablet computer, a smart television, a processor (e.g. digital signal processor (DSP), a microcontroller, a field-programmable gate array (FPGA), an application specific integrated circuit (ASIC), etc.), a group of multiple physical machines sharing performance of various tasks, virtual servers co-residing on a single physical machine, any other electronic computing device, and/or any combination thereof.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

In embodiments of the presently disclosed subject matter, fewer, more and/or different stages than those shown in FIG.

2 may be executed. FIG. 1 illustrates a general schematic of the architecture of a wireless communications system, in accordance with embodiments of the presently disclosed subject matter. Each module in FIG. 1 can be made up of any combination of software, hardware and/or firmware that performs the functions as defined and explained herein. The modules in FIG. 1 may be centralized in one location or dispersed over more than one location. In other embodiments of the presently disclosed subject matter, the system may comprise fewer, more, and/or different modules than those shown in FIG. 1.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Attention is now drawn to FIG. 1, a block diagram schematically illustrating an example of a wireless communications system 100, in accordance with the presently disclosed subject matter.

In accordance with the presently disclosed subject matter, wireless communications system 100 includes a plurality of communications devices that communicate over a communications network 105. FIG. 1 illustrates a source device 110 and a destination device 120 within the wireless communications system 100. For the purposes of this disclosure, any communication device in the wireless communications system 100 that is transmitting data frames is referred to as a source device 110, and any communication device in the wireless communications system 100 that is receiving data frames that are transmitted by a source device 110 is referred to as a destination device 120.

Each of the communication devices in the wireless communications system 100, including, inter alia, source device 110, can be configured to include a wireless data transmission system 130. The wireless data transmission system 130 of a respective communication device (e.g., source device 110) in the wireless communications system 100 includes a processing circuitry 140 having a source transmitter 145. The processing circuitry 140 can include one or more processing units (e.g. central processing units), microprocessors, microcontrollers (e.g. microcontroller units (MCUs)) or any other computing devices or modules, including multiple and/or parallel and/or distributed processing units, which are adapted to independently or cooperatively process data for controlling relevant resources of the wireless data transmission system 130 and for enabling operations related to the resources of the wireless data transmission system 130.

The processing circuitry 140 of a source device 110 in the wireless communications system 100 (the source device 110 being any communication device in the wireless communications system 100 that is transmitting data frames) is configured to generate data frames, each data frame of the data frames comprising one or more distinct data messages for transmission to at least one destination device 120 in the wireless communications system 100. The source transmitter 145 of the processing circuitry 140 is configured to transmit the generated data frames, via at least one antenna, from the source device 110 to one or more destination devices 120. Each of the data frames that is transmitted from a source device 110 to a destination device 120 is transmitted over a respective communication link 150 of communications network 105.

Each of the communication devices in the wireless communications system 100 can be configured to include a receiver. For example, as illustrated in FIG. 1, source device 110 includes a source receiver 160, and destination device 120 includes a designated receiver 170. The receiver of a respective communication device in the wireless communications system 100 can be configured to receive data frames of distinct data messages that are transmitted by other communication devices in the wireless communications system 100. For example, the designated receiver 170 can be configured to receive data frames of distinct data messages that are transmitted by source transmitter 145 of source device 110 over communications link 150.

In response to a successful detection of a respective distinct data message, of one or more distinct data messages in a given data frame, by a designated receiver 170 of a destination device 120, the destination device 120 is configured to transmit a signal indicative of the successful detection (e.g., an acknowledgment (ACK) signal) to the source device 110 that transmitted the respective distinct data message, via the communications link 150. In some cases, the signal that is indicative of the successful detection can implicitly indicate that the respective distinct data message was successfully detected by indicating the distinct data messages in the given data frame that were not successfully detected.

In response to the respective distinct data message not being successfully detected by the designated receiver 170 in the given frame, and given that a delay requirement of the communications link 150 between the source device 110 and the destination device 120 enables a retransmission of the respective distinct data message (i.e., a transmission of a copy of the respective distinct data message) to the designated receiver 170 in a subsequent data frame, subsequent to the given data frame, the source device 110 can retransmit the respective distinct data message in the subsequent data frame, or put differently, transmit a copy of the respective distinct data message in the subsequent data frame. It is to be noted that, in some cases, the copy of the respective distinct data message does not need to be identical to the respective distinct data message, provided that the informational content of the respective distinct data message and the copy thereof is identical.

In some cases, a source device 110 that transmits a distinct data message can be made aware that the distinct data message was not successfully detected by the designated receiver 170, upon a receipt of a non-acknowledgment (NACK) signal by a source receiver 160 of source device 110, the NACK signal being transmitted by the destination device 120 that includes the designated receiver 170 over the communication link 150.

Additionally, or alternatively, in some cases, the source device 110 that transmits the distinct data message can be made aware that the distinct data message was not successfully detected by the designated receiver 170 without receipt of a NACK signal, e.g., upon the passage of a given period of time since the transmission of the distinct data message.

Figure 2:
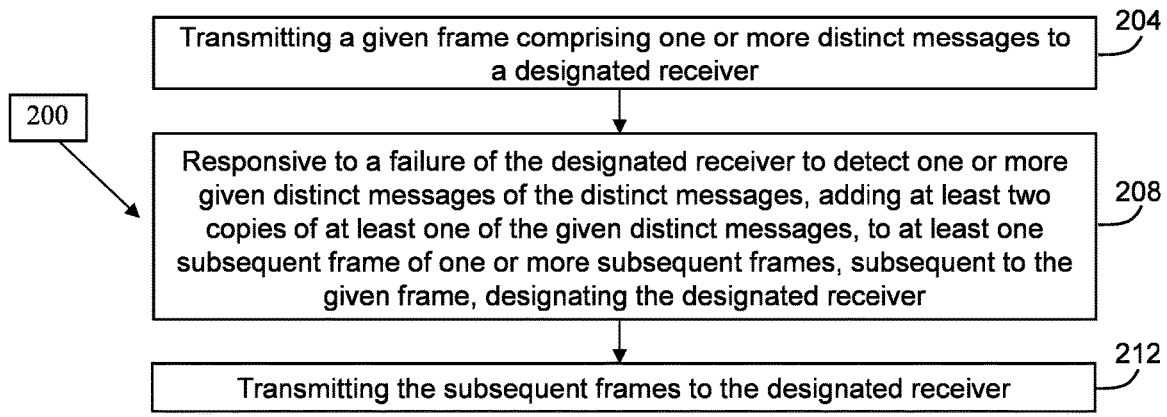
FIG. 2 is a flowchart illustrating one example of a wireless data transmission method, in accordance with the presently disclosed subject matter.

Attention is now drawn to FIG. 2, a flowchart illustrating one example of a wireless data transmission method 200, in accordance with the presently disclosed subject matter.

In accordance with the presently disclosed subject matter, a wireless data transmission system 130 of a source device 110 can be configured, e.g., using a processing circuitry 140, to transmit a given frame comprising one or more distinct messages (i.e., bursts) to a designated receiver 170 (block 204).

Upon a failure of the designated receiver 170 to detect one or more given distinct messages of the distinct messages that were first transmitted in the given frame, wireless data transmission system 130 can be configured, e.g., using the processing circuitry 140, to add at least one copy of respective given distinct messages of the given distinct messages (i.e., each of the given distinct messages) to a first subsequent frame designating the designated receiver 170, the first subsequent frame being successive to the given frame. The first subsequent frame can then be transmitted to the designated receiver 170. Examples of factors that are taken into account in determining the number of copies of each of the given distinct messages that are to be added to the first subsequent frame are detailed below.

The first subsequent frame is one of one or more subsequent frames successive to the given frame that include at least one copy of at least one of the given distinct messages and designate the designated receiver 170. For each subsequent frame of the subsequent frames that follow the first subsequent frame, only copies of the given distinct messages that have not been successfully detected by the designated receiver 170 in one of the earlier subsequent frames, earlier than the respective subsequent frame, are transmitted in the respective subsequent frame.

To illustrate this, assume that three given distinct messages of the distinct messages that were first transmitted in the given frame are not successfully detected by the designated receiver 170. In this case, at least one copy of each of the three given distinct messages can be added to the first subsequent frame, which is then transmitted to the designated receiver 170. Now assume that one of the three given distinct messages is successfully detected by the designated receiver 170 following the receipt of the first subsequent frame by the designated receiver 170. In this case, at least one copy of each of the two given distinct messages that were not successfully detected by the designated receiver 170 following the receipt of the first subsequent frame by the designated receiver 170 can, in some cases, be added to a second subsequent frame that is successive to the first subsequent frame, wherein the second subsequent frame is then transmitted to the designated receiver 170.

Now assume that one of the two given distinct messages that were not successfully detected by the designated receiver 170 following the receipt of the first subsequent frame by the designated receiver 170 is successfully detected by the designated receiver 170 following the receipt of the second subsequent frame by the designated receiver 170. (It is to be noted, in this regard, that a given distinct message is considered to be not successfully detected in a subsequent frame only if all copies of the given distinct message that are transmitted in the subsequent frame are not successfully detected.) In this case, provided that a third subsequent frame that includes a copy of at least one of the given distinct messages can be transmitted, the third subsequent frame being successive to the second subsequent frame, at least one copy of the given distinct message that was not successfully detected by the designated receiver 170 following the receipt of the second subsequent frame can be added to the third subsequent frame, which is then transmitted to the designated receiver 170. A determination as to whether or not a third subsequent frame that includes a copy of at least one of the given distinct messages can be transmitted can be made in accordance with a delay requirement for the communication link 150 between the wireless data transmission system 130 and the designated receiver 170. It is to be noted, in this regard, that, in some cases, the delay requirement for the communication link 150 can be different for different types of distinct messages that are first transmitted in the given frame.

If one or more of the given distinct messages are not successfully detected by the designated receiver 170 following a transmission of a maximum number of subsequent frames to the designated receiver 170 that can include copies of the respective given distinct message, the given distinct messages that are not successfully detected are dropped (i.e., neglected). The maximum number of subsequent frames that can include copies of the given distinct messages, for each of the given distinct messages, are referred to hereinafter, interchangeably, as allowed retransmission frames. A respective data frame that is transmitted subsequent to the given frame includes at least one copy of at least one of the given distinct messages, i.e., is a subsequent frame, only if at least one of the given distinct messages has yet to be successfully detected by the designated receiver 170 and the respective data frame is one of the allowed retransmission frames for the at least one of the given distinct messages.

The subsequent frames, being the data frames that actually include at least one copy of at least one of the given distinct messages (as defined above), are a subset of the allowed retransmission frames. That is, a number of the subsequent frames is less than or equal to a number of the allowed retransmission frames. For each of the given distinct messages that is successfully detected by the designated receiver 170 prior to a transmission of at least one of the allowed retransmission frames for the respective given distinct message, then the subsequent frames are some of the allowed retransmission frames for the respective given distinct message. Otherwise, the subsequent frames are all of the allowed retransmission frames for the respective given distinct message. The number of allowed retransmission frames for a respective given distinct message can be determined based on a delay requirement for the communication link 150 between the wireless data transmission system 130 and the designated receiver 170.

If the subsequent frames that have been transmitted to the designated receiver 170 are all of the allowed retransmission frames for the respective given distinct message and the respective given distinct message has not been successfully detected by the designated receiver 170, the respective given distinct message is dropped (i.e., neglected). Each given distinct message that is dropped reduces the Quality of Service (QoS) of the communication link 150.

It is an object of the present disclosure to increase the QoS of the communication link 150, and specifically to reduce the number of dropped data messages that are transmitted over the communication link 150. To achieve this, in some cases in which the designated receiver 170 fails to detect one or more given distinct messages of the distinct messages that are transmitted to the designated receiver 170 in the given frame, wireless data transmission system 130 can be configured, e.g., using processing circuitry 140, to add at least two copies of at least one of the given distinct messages to at least one subsequent frame of the subsequent frames (block 208). The factors that may be taken into account in determining whether the wireless data transmission system 130 will add at least two copies of at least one of the given distinct messages to at least one subsequent frame of the subsequent frames are provided below. Wireless data transmission system 130 can be configured, e.g., using processing circuitry 140, to transmit the subsequent frames to the designated receiver 170 (block 212).

In some cases, the communication link 150 between the wireless data transmission system 130 and the designated receiver 170 has a Quality of Service (QoS) requirement. The QoS requirement for the communication link 150 requires that a probability that any distinct message of the distinct messages that are transmitted over the communication link 150 will not be detected by the designated receiver 170 following the transmission of the allowed retransmission frames for the respective distinct message be less than or equal to a threshold probability. Wireless data transmission system 130 can be configured, e.g., using processing circuitry 140, to provide both the QoS requirement and the delay requirement for the communication link 150.

To explain the QoS requirement, the following example is provided. In the example, there is a probability of 0.1% that a given transmission of a distinct data message from a wireless data transmission system 130 of a source device 110 to a designated receiver 170 over a communication link 150 will not be detected by the designated receiver 170. That is, the average message error rate associated with the communication link 150 is 0.001. In addition, the threshold probability is 0.0001%. Furthermore, one or more given distinct messages of the distinct messages that are transmitted in a given frame (i.e., a first frame in which the distinct messages are transmitted) are not detected by the designated receiver 170 based on a decoding of the given frame only. Moreover, each copy of a respective given distinct message that is transmitted is detected by the designated receiver 170 based on the data bits in the copy alone (i.e., independently of earlier transmissions of the given distinct message). In this example, at least three retransmission copies of the given distinct data messages must be allocated to the allowed retransmission frames to meet the QoS requirement. To explain, provided that each transmission of each given distinct data message of the given distinct data messages is detected by the designated receiver 170 based on the data bits of the respective transmission only, the probability that a respective given distinct data message of the given distinct data messages will not be detected by the designated receiver 170 following two transmissions thereof is 0.01% [$(0.1\%)^2$], which is greater than the threshold probability of 0.0001%; the probability that the respective given distinct data message will not be detected by the designated receiver 170 following three transmissions thereof is 0.001% [$(0.1\%)^3$]; and the probability that the respective given distinct data message will not be detected by the designated receiver 170 following four transmissions thereof is 0.0001% [$(0.1\%)^4$], the threshold probability. As such, in the provided example, in order to meet the QoS requirement for the communication link 150, three retransmission copies of each of the given distinct messages that were not detected by the designated receiver 170 following receipt of the originally transmitted data frame (i.e., the given frame) must be allocated to the allowed retransmission frames.

In some cases, the designated receiver 170 can be configured, for each of the copies of the given distinct messages that are transmitted to the designated receiver 170 in the subsequent frames, to detect the respective given distinct message by performing a soft combining of a last transmitted copy of the respective given distinct message with one or more earlier transmissions of the respective given distinct message, in accordance with a Hybrid Automatic Repeat Request (HARQ) scheme. It is to be noted that, if soft combining is performed by the designated receiver 170, the number of allocated retransmission copies of the given distinct messages that are required to meet the QoS requirement can be reduced relative to the embodiment in which each transmission of a respective given distinct message is decoded independently of earlier transmissions of the respective given distinct message.

In some cases, each copy of each of the given distinct messages that is transmitted to the designated receiver 170 in the subsequent frames can be a distinct redundancy version of the respective given distinct message, wherein the respective given distinct message has a plurality of distinct redundancy versions. In some cases, for at least one of the given distinct messages, a first redundancy version of the respective given distinct message and a second redundancy version of the respective given distinct message can be alternatively transmitted in the subsequent frames. For example, for a respective given distinct message of the given distinct messages, if three copies of the respective given distinct message are transmitted in the subsequent frames, the first copy can be of a first redundancy version; the second copy, being successive to the first copy, can be of a second redundancy version; and the third copy, being successive to the second copy, can be of the first redundancy version.

In some cases, in which a first redundancy version of the respective given distinct message and a second redundancy version of the respective given distinct message are alternately transmitted, the first redundancy version can be generated by puncturing the respective given distinct message with a first puncturing code, and the second redundancy version can be generated by puncturing the respective given distinct message with a second puncturing code that is complementary to the first puncturing code.

In the cases in which the transmitted copies of a respective given distinct message are of different redundancy versions, the designated receiver 170 can be configured to perform soft combining to detect the respective given distinct message.

In some cases, each copy of each of the given distinct messages that are included in the subsequent frames can be independently decodable. In some cases, each copy of each of the given distinct messages that are included in the subsequent frames can be independently decodable even in the case that soft combining is performed.

As noted earlier herein, in order to meet the QoS requirement for a communication link 150, a given number of retransmission copies of each of the given distinct messages that were not detected by the designated receiver 170 in the given frame can be allocated to allowed retransmission frames that are usable for retransmitting the given distinct messages. It is to be noted that, in some cases, at least one of the retransmission copies can also be transmitted in the given frame itself, for example, when the data load over the communication link 150 is sparse, as explained below. In some cases, in order to meet the QoS requirement for the communication link 150, the given number of retransmission copies of at least one of the given distinct messages that must be allocated to the allowed retransmission frames is greater than the number of allowed retransmission frames. In such cases, in order to meet the QoS requirement for the communication link 150, wireless data transmission system 130 can be configured, using processing circuitry 140, to allocate at least two copies of the at least one of the given distinct messages to at least one allowed retransmission frame of the allowed retransmission frames for the at least one of the given distinct messages.

Prior to allocating the copies of the given distinct messages across the allowed retransmission frames for the given distinct messages to meet the QoS requirement, wireless data transmission system 130 can be configured, e.g., using processing circuitry 140, to provide the (QoS) requirement, the delay requirement for the communication link 150, and the average message error rate associated with the communication link 150. In some cases, at least one of the QoS requirement, the delay requirement or the average message error rate can be obtained, directly or indirectly, by wireless data transmission system 130, for example, from a server (not shown) in the communications network 105. Additionally, or alternatively, in some cases, at least one of the QoS requirement, the delay requirement or the average message error rate can be provided by the source device 110. Based on the QoS requirement and the average message error rate, wireless data transmission system 130 can be configured, e.g., using processing circuitry 140, to determine a number of allocated retransmission copies of each of the given distinct messages that are to be allocated to the allowed retransmission frames to enable the QoS requirement to be met.

Moreover, based on the delay requirement, wireless data transmission system 130 can be configured, e.g., using processing circuitry 140, to determine the number of allowed retransmission frames over which the allocated retransmission copies of each of the given distinct messages are allocated. As noted earlier herein, for each respective given distinct message, a number of the subsequent frames that include at least one copy of the respective given distinct message is less than or equal to the number of allowed retransmission frames. As a corollary thereof, a total number of actual retransmission copies of each of the given distinct messages that are transmitted is less than or equal to the number of allocated retransmission copies, as explained in greater detail below. Wireless data transmission system 130 can be configured, e.g., using processing circuitry 140, to determine a distribution of the allocated retransmission copies of the given distinct messages across the allowed retransmission frames for the given distinct messages, based on the determination of the number of allowed retransmission frames and the number of allocated retransmission copies, as explained in greater detail below.

In some cases, the distribution of the allocated retransmission copies of the given distinct messages across the allowed retransmission frames can also be determined in view of the current data load over the communications link 150. In some cases, the data load over the communications link 150 is sparse. That is, there is relatively little new message data and relatively few copies of given distinct messages that are to be transmitted in the allowed retransmission frames. In some such cases, more of the copies of the given distinct messages can be allocated to earlier allowed retransmission frames of the allowed retransmission frames, since there is free space in the allowed retransmission frames (i.e., the allowed retransmission frames are free space frames).

To illustrate this, assume that seven copies of one or more given distinct messages are to be allocated over three allowed retransmission frames for the given distinct messages, for example, to meet the QoS requirement for the communications link 150. Assume further that the data load over the communications link 150 is sparse. That is, there is sparse new message data and a small number of copies of given distinct messages that need to be transmitted in the allowed retransmission frames. In some such cases, the distribution of the copies of the given distinct messages over the allowed retransmission frames can be front-loaded. That is, due to the amount of free space for retransmissions in the allowed retransmission frames and the small number of copies of the given distinct messages that need to be transmitted over the allowed retransmission frames, more copies of the given distinct messages can be allocated to earlier allowed retransmission frames from among the allowed retransmission frames. For example, the copies of the given distinct messages can be allocated as follows: (3, 3, 1). That is, three copies of each of the given distinct messages are allocated to the first allowed retransmission frame of the allowed retransmission frames. Moreover, three copies of each of the given distinct messages that were not decoded following the transmission of the given distinct messages in the first allowed retransmission frame, if any, are allocated to the second allowed retransmission frame of the allowed retransmission frames, the second allowed retransmission frame being successive to the first allowed retransmission frame. In addition, one copy of each of the given distinct messages that were transmitted in the second allowed retransmission frame and not decoded following the transmission of the second allowed retransmission frame, if any, is allocated to the third allowed retransmission frame of the allowed retransmission frames, the third allowed retransmission frame being successive to the second allowed retransmission frame. It is to be noted, in this regard, that, in some cases, one or more copies of new message data in a respective allowed retransmission frame can be retransmitted in the respective allowed retransmission frame, e.g., if the data load over the communications link 150 (i.e., in the transmitted data frame) is sparse. To illustrate this, assume that an allowed retransmission frame includes 30 bursts. The first three bursts are allocated for transmission of copies of given distinct messages that were not detected following one or more earlier transmissions thereof. The next 10 bursts are allocated for transmissions of new message data. This leaves 17 bursts in the allowed retransmission frame that are empty. Assuming that three copies of each of the given distinct messages that were not detected following earlier transmissions thereof are to be transmitted in the allowed retransmission frame, this means that an additional 9 bursts in the allowed retransmission frame are used to transmit the copies of the given distinct messages. This leaves 8 bursts in the allowed retransmission frame that are empty. These 8 bursts can be allocated to retransmit new data messages that are first transmitted in the allowed retransmission frame.

It is to be noted that the copies of the given distinct messages that are to be transmitted, e.g., to meet the QoS requirement, can also be allocated over both the given frame (the original frame in which the given distinct messages are transmitted) and allowed retransmission frames. Assuming, as above, that seven copies of the given distinct messages are to be allocated over three allowed retransmission frames for the given distinct messages, in essence the seven copies can be allocated over the given frame itself and the allowed retransmission frames. For example, if the given frame is sparse, at least one copy of a new data message in the given frame can be included in the given frame (that is, the new data message can be transmitted twice in the given frame). Since the new data message has been transmitted twice in the given frame, if the new data message is not detected by the designated receiver 170 following the transmission of the given frame, only six copies of the new data message (now a given distinct message) need to be allocated over the allowed retransmission frames.

Continuing with the example in which seven copies of each of the given distinct messages are to be allocated over three allowed retransmission frames, assume that the data load over the communications link 150 is a normal data load. That is, there is a normal amount of new message data and a small number of copies of given distinct messages that need to be transmitted in the allowed retransmission frames. In some such cases, the allocation of the copies of the given distinct messages over the allowed retransmission frames can be back-loaded. That is, since the amount of free space for retransmissions in the allowed retransmission frames is limited and the number of retransmissions is small, more copies of the given distinct messages can be allocated to later allowed retransmission frames from among the allowed retransmission frames, thereby increasing transmission efficiency. For example, the copies of the given distinct messages can be allocated as follows: (1, 1, 5). That is, one copy of each of the given distinct messages is allocated to the first allowed retransmission frame of the allowed retransmission frames. Moreover, one copy of each of the given distinct messages that were not decoded following the transmission of the given distinct messages in the first allowed retransmission frame, if any, is allocated to the second allowed retransmission frame of the allowed retransmission frames. In addition, five copies of each of the given distinct messages that were transmitted in the second allowed retransmission frame and not decoded following the transmission of the second allowed retransmission frame, if any, are allocated to the third allowed retransmission frame of the allowed retransmission frames.

Now, for the example in which seven copies of each of the given distinct messages are to be allocated over three allowed retransmission frames, assume that the data load over the communications link 150 is unusually high. That is, there is a normal amount of new message data and a large number of copies of given distinct messages that need to be transmitted in the allowed retransmission frames. In some such cases, in order to avoid a heavy data load in the later allowed retransmission frames of the allowed retransmission frames, the allocation of the copies of the given distinct messages over the allowed retransmission frames can be relatively balanced over the allowed retransmission frames. For example, the copies of the given distinct messages can be allocated as follows: (2, 2, 3). That is, two copies of each of the given distinct messages are allocated to the first allowed retransmission frame of the allowed retransmission frames. Moreover, two copies of each of the given distinct messages that were not decoded following the transmission of the given distinct messages in the first allowed retransmission frame, if any, are allocated to the second allowed retransmission frame of the allowed retransmission frames. In addition, three copies of each of the given distinct messages that were transmitted in the second allowed retransmission frame and not decoded following the transmission of the second allowed retransmission frame, if any, are allocated to the third allowed retransmission frame of the allowed retransmission frames. In some cases, due to the multiple retransmissions in each of the allowed retransmission frames, new message data may be deferred from the allowed retransmission frame in which the new message data was to have been transmitted to a subsequent data frame.

A brief description of potential orderings of the copies of given distinct messages and the new message data in the subsequent frames is now provided. In some cases, for each subsequent frame of the subsequent frames, at least one of the copies of each of the given distinct messages that are added to the respective subsequent frame can be added to a leading end of the respective subsequent frame, or, put differently, prior to an addition of new message data to the respective subsequent frame. In some cases, all of the copies of each of the given distinct messages that are added to the subsequent frames can be added to a leading end of the subsequent frames. In this manner, the copies of the given distinct messages can be received by the designated receiver 170 earlier than the new message data, thereby minimizing the amount of time required to successfully detect the given distinct messages. To clarify this, the ordering of data messages in any respective data frame can be made in accordance with the remaining amount of time left to detect each of the data messages, in accordance with the delay requirements for each of the data messages. Assuming that the delay requirement and the QoS requirement for each of the data messages is the same, retransmissions of given distinct messages can be performed in the respective data frame prior to the transmissions of new message data, and later retransmissions can be performed prior to earlier retransmissions.

In some cases in which the data load over the communications link 150 is sparse, one copy of each of the given distinct messages that are transmitted in the subsequent frames can be added at the leading end of the subsequent frames, followed by the new message data. Since the new data message is sparse, additional (second, third, etc.) copies of the given distinct messages that are to be added in the subsequent frames can be added following the new message data. As an additional example, in some cases in which the data load over the communications link 150 is normal or unusually heavy, all of the copies of each of the given distinct messages that are to be added to the subsequent frames can be added to a leading end of the subsequent frames. It is to be noted that all of the examples provided herein for the orderings of the copies of given distinct messages and the new message data in the subsequent frames are provided for exemplary purposes only and are not intended to be limiting.

In some cases, the copies of the given distinct messages that are added to the subsequent frames can be added in accordance with an appearance order of the given distinct messages in the given frame in which the given distinct messages were originally transmitted. In some cases, this may be done, provided that in this manner the copies of the given distinct messages are ordered such that the given data messages are time-ordered from the given data message that has the least remaining amount of time left to be detected to the given data message that has the most remaining amount of time left to be detected.

In some cases, wireless data transmission system 130 can be configured, e.g., using the processing circuitry 140, to employ frequency hopping during the transmission of data frames, e.g., the given frame and the subsequent frames, to the designated receiver 170, e.g., to counter artificial interferences that interfere with the communications link 150.

It is to be noted that, with reference to FIG. 2, some of the blocks can be integrated into a consolidated block or can be broken down to a few blocks and/or other blocks may be added. It is to be further noted that some of the blocks are optional. It should be also noted that whilst the flow diagrams are described also with reference to the system elements that realizes them, this is by no means binding, and the blocks can be performed by elements other than those described herein.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phrascology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

It will also be understood that the system according to the presently disclosed subject matter can be implemented, at least partly, as a suitably programmed computer. Likewise, the presently disclosed subject matter contemplates a computer program being readable by a computer for executing the disclosed method. The presently disclosed subject matter further contemplates a machine-readable memory tangibly embodying a program of instructions executable by the machine for executing the disclosed method.

The invention claimed is:

1. A wireless data transmission system, the wireless data transmission system comprising a processing circuitry configured to:
   provide (a) a Quality of Service (QoS) requirement for a communication link between the wireless data transmission system and a designated receiver, and (b) a delay requirement for the communication link;
   transmit a given frame comprising one or more distinct messages to the designated receiver;
   responsive to a failure of the designated receiver to detect one or more given distinct messages of the distinct messages, add: (a) one or more first copies of at least one given distinct message of the given distinct messages, to at least one first subsequent frame of one or more subsequent frames, subsequent to the given frame, designating the designated receiver, and (b) one or more second copies of the given distinct message to at least one second subsequent frame of the subsequent frames, the second subsequent frame being distinct from the first subsequent frame, wherein a first number of the first copies is different than a second number of the second copies, and wherein the addition of the first copies and the second copies is performed to meet the QoS requirement in accordance with the delay requirement; and
   transmit the subsequent frames to the designated receiver.

2. The wireless data transmission system of claim 1, wherein the processing circuitry is further configured to:
   determine:
   (a) based on the delay requirement, a first number of allowed retransmission frames usable for retransmitting the given distinct messages, wherein a second number of the subsequent frames is less than or equal to the first number of allowed retransmission frames; and
   (b) based on the QoS requirement, a third number of allocated retransmission copies of the given distinct messages, wherein a total number of actual retransmission copies of each of the given distinct messages is less than or equal to the third number of allocated retransmission copies.

3. The wireless data transmission system of claim 2, wherein the subsequent frames are transmitted until receipt of a success notification indicative of a success of receipt of the given distinct messages, or until the second number of the subsequent frames equals the first number of allowed retransmission frames.

4. The wireless data transmission system of claim 2, wherein the third number of allocated retransmission copies is also determined based on an average message error rate associated with the communication link.

5. The wireless data transmission system of claim 2, wherein the processing circuitry is further configured to determine a distribution of the allocated retransmission copies of each of the given distinct messages across the allowed retransmission frames.

6. The wireless data transmission system of claim 1, wherein, for each subsequent frame of the subsequent frames, at least one copy of each of the given distinct messages that are added to the respective subsequent frame is added to a leading end of the respective subsequent frame.

7. The wireless data transmission system of claim 1, wherein the processing circuitry is further configured to employ frequency hopping during a transmission of the subsequent frames.

8. The wireless data transmission system of claim 1, wherein upon one or more of the subsequent frames having free space, being free space frames, the processing circuitry is further configured to add free space copies of one or more of the given distinct messages to the free space in the free space frames.

9. The wireless data transmission system of claim 1, wherein the copies of the given distinct messages that are added to the subsequent frames are independently decodable.

10. A wireless data transmission method, comprising:
    providing (a) a Quality of Service (QoS) requirement for a communication link between a wireless data transmission system and a designated receiver, and (b) a delay requirement for the communication link;
    transmitting to the designated receiver, by the wireless data transmission system, a given frame comprising one or more distinct messages;
    responsive to a failure of the designated receiver to detect one or more given distinct messages of the distinct messages, adding: (a) one or more first copies of at least one given distinct message of the given distinct messages, to at least one first subsequent frame of one or more subsequent frames, subsequent to the given frame, designating the designated receiver, and (b) one or more second copies of the given distinct message to at least one second subsequent frame of the subsequent frames, the second subsequent frame being distinct from the first subsequent frame, wherein a first number of the first copies is different than a second number of the second copies, and wherein the addition of the first copies and the second copies is performed to meet the QoS requirement in accordance with the delay requirement; and
    transmitting the subsequent frames to the designated receiver.

11. The wireless data transmission method of claim 10, further comprising:
    determining:
    (a) based on the delay requirement, a first number of allowed retransmission frames usable for retransmitting the given distinct messages, wherein a second number of the subsequent frames is less than or equal to the first number of allowed retransmission frames; and (b) based on the QoS requirement, a third number of allocated retransmission copies of the given distinct messages, wherein a total number of actual retransmission copies of each of the given distinct messages is less than or equal to the third number of allocated retransmission copies.

12. The wireless data transmission method of claim 11, wherein the subsequent frames are transmitted until receipt of a success notification indicative of a success of receipt of the given distinct messages, or until the second number of the subsequent frames equals the first number of allowed retransmission frames.

13. The wireless data transmission method of claim 11, wherein the third number of allocated retransmission copies is also determined based on an average message error rate associated with the communication link.

14. The wireless data transmission method of claim 11, further comprising:
determining a distribution of the allocated retransmission copies of each of the given distinct messages across the allowed retransmission frames.

15. The wireless data transmission method of claim 10, wherein, for each subsequent frame of the subsequent frames, at least one copy of each of the given distinct messages that are added to the respective subsequent frame is added to a leading end of the respective subsequent frame.

16. The wireless data transmission method of claim 15, wherein the at least one copy of each of the given distinct messages that is added to the leading end of the respective subsequent frame is added in accordance with an appearance order of the given distinct messages in the given frame.

17. The wireless data transmission method of claim 10, further comprising:
employing frequency hopping during a transmission of the subsequent frames.

18. The wireless data transmission method of claim 10, wherein upon one or more of the subsequent frames having free space, being free space frames, the method further comprises:

adding free space copies of one or more of the given distinct messages to the free space in the free space frames.

19. The wireless data transmission method of claim 10, wherein the copies of the given distinct messages that are added to the subsequent frames are independently decodable.

20. A non-transitory computer readable storage medium having computer readable program code embodied therewith, the computer readable program code, executable by at least one processor of a computer to perform a wireless data transmission method comprising:
providing (a) a Quality of Service (QoS) requirement for a communication link between a wireless data transmission system and a designated receiver, and (b) a delay requirement for the communication link;
transmitting to the designated receiver, by the wireless data transmission system, a given frame comprising one or more distinct messages;
responsive to a failure of the designated receiver to detect one or more given distinct messages of the distinct messages, adding: (a) one or more first copies of at least one given distinct message of the given distinct messages, to at least one subsequent frame of one or more subsequent frames, subsequent to the given frame, designating the designated receiver, and (b) one or more second copies of the given distinct message to at least one second subsequent frame of the subsequent frames, the second subsequent frame being distinct from the first subsequent frame, wherein a first number of the first copies is different than a second number of the second copies, and wherein the addition of the first copies and the second copies is performed to meet the Qos requirement in accordance with the delay requirement; and
transmitting the subsequent frames to the designated receiver.

* * * * *